No. 873,502. PATENTED DEC. 10, 1907.
J. O. CARLSON & C. O. HEDSTROM.
ANIMAL TRAP.
APPLICATION FILED JULY 23, 1907.
2 SHEETS—SHEET 1.
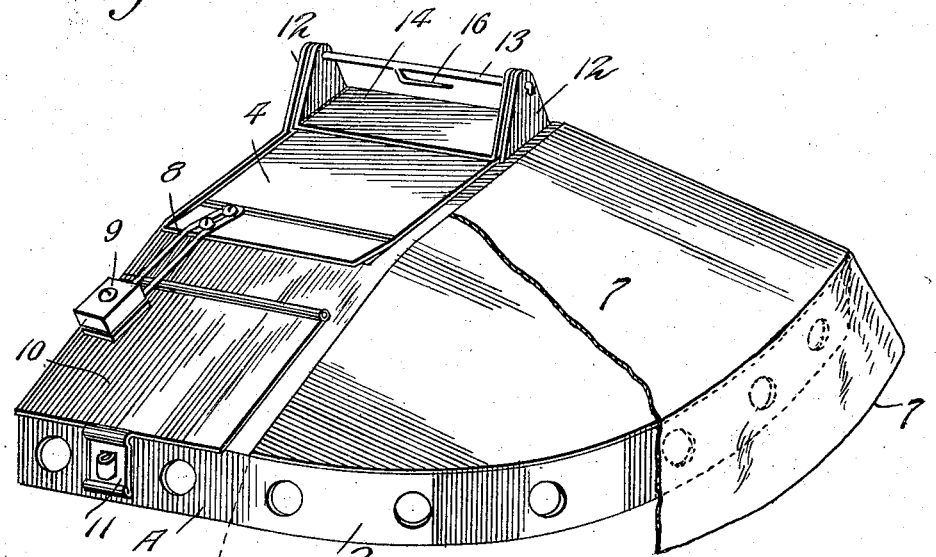
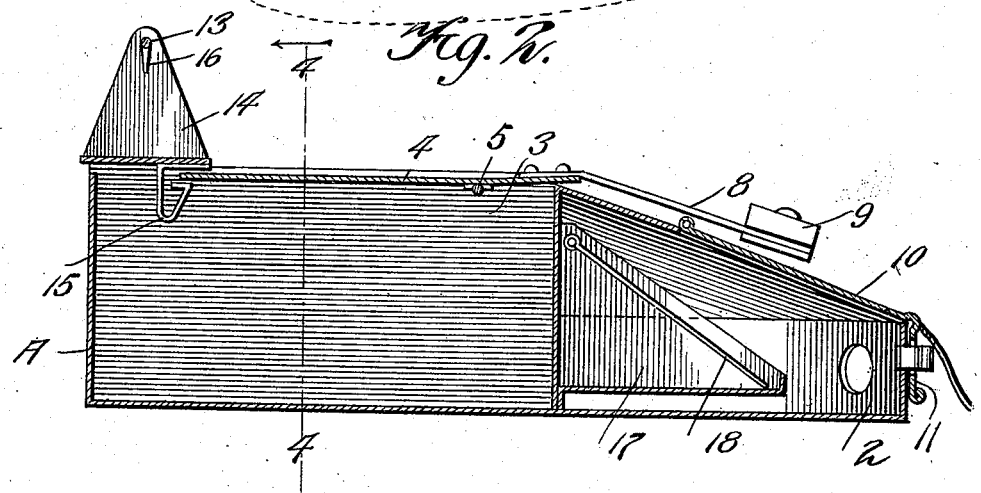
Witnesses
Inventors
John O. Carlson
Carl Oscar Hedstrom
By Victor J. Evans
Attorney No. 873,502. PATENTED DEC. 10, 1907.
J. O. CARLSON & C. O. HEDSTROM.
ANIMAL TRAP.
APPLICATION FILED JULY 23, 1907.
2 SHEETS—SHEET 2.
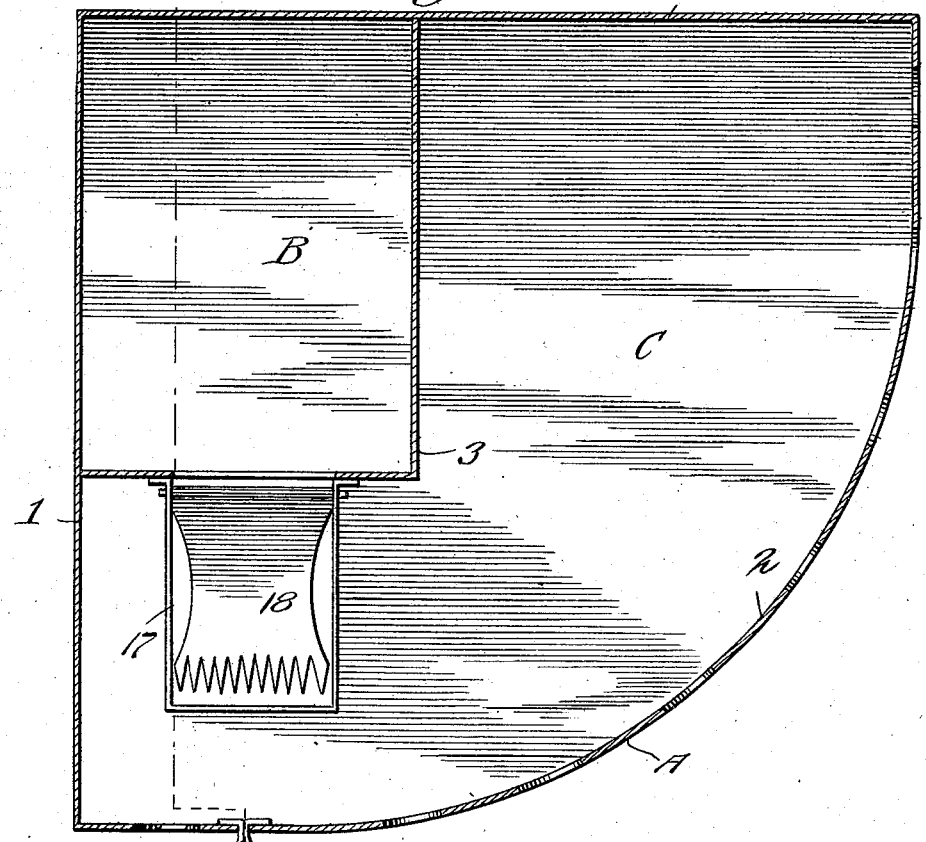
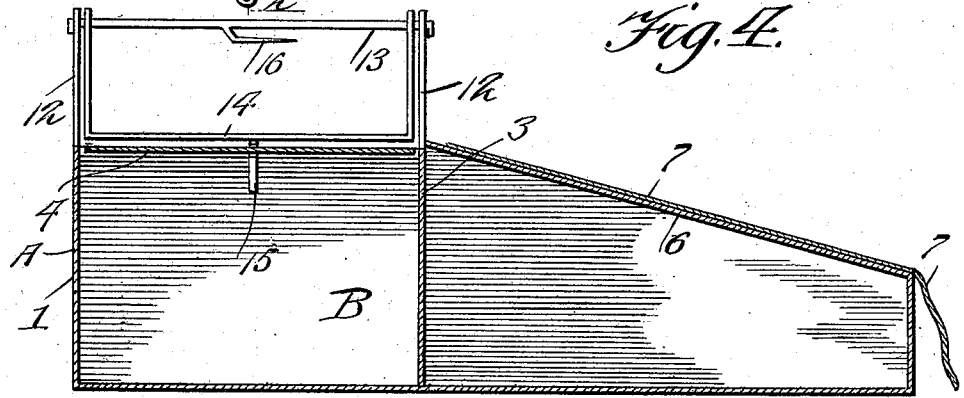

UNITED STATES PATENT OFFICE.

JOHN O. CARLSON AND CARL OSCAR HEDSTROM, OF FUNK, NEBRASKA.

ANIMAL-TRAP.

No. 873,502.     Specification of Letters Patent.     Patented Dec. 10, 1907.

Application filed July 23, 1907. Serial No. 385,166.

*To all whom it may concern:*

Be it known that we, JOHN O. CARLSON and CARL OSCAR HEDSTROM, citizens of the United States, residing at Funk, in the county of Phelps and State of Nebraska, have invented new and useful Improvements in Animal-Traps, of which the following is a specification.

This invention relates to animal traps, and it has for its object to provide a device of this class which shall be self-setting; that is to say, in which the entrance of a victim into the trap leaves the latter reset and in condition for operation, the means whereby this is accomplished being of a simple and improved nature.

Further objects of the invention are to simplify and improve the construction and operation of this class of devices.

With these and other ends in view which will readily appear as the nature of the invention is better understood, the same consists in the improved construction and novel arrangement and combination of parts which will be hereinafter fully described, and particularly pointed out in the claims.

In the accompanying drawings has been illustrated a simple and preferred form of the invention; it being however, understood that no limitation is necessarily made to the precise structural details herein exhibited, but that changes, alterations and modifications within the scope of the claims may be resorted to when desired.

In the drawings: Figure 1 is a perspective view of a trap constructed in accordance with the invention. Fig. 2 is a vertical sectional view taken on the plane indicated by the line 2—2 in Fig. 3. Fig. 3 is a horizontal sectional view. Fig. 4 is a vertical transverse sectional view taken on the plane indicated by the line 4—4 in Fig. 2.

Corresponding parts in the several figures are indicated by like characters of reference.

The improved trap may be of any desired size and shape; the example illustrated in the drawings is in the shape of a quadrant, because this shape enables the trap to be conveniently placed in the corner of a room, barn, ware-house, or other place where vermin have their runways, in such a manner as to present no obstruction and to avert exciting the suspicion of the victims. The body of the trap is preferably made of sheet metal, and said body contains two separate compartments, one of which, B is located in the angle formed by the intersection of the two straight side walls 1, 1, while the larger compartment C is formed between the outer curved wall 2 of the casing and the partition wall 3 within the latter.

The primary compartment B is provided with a flat top 4 which constitutes a trap door, the same being provided with a rock shaft 5, the ends of which are pivoted in one of the side walls of the casing, and in the partition wall 3; the top 6 of the compartment C preferably slopes from the partition 3 in the direction of the outer wall 2 of the casing, and upon the said sloping top there is secured a cover 7 of textile fabric which will afford a firm and convenient foot hold for the vermin who will thus be induced to move in the direction of the trap door 4. The latter has an outwardly extending arm 8 carrying a weight 9 whereby the trap door is counterbalanced and whereby it will be retained in its proper, or set position.

The compartment C of the trap is provided with a door 10, conveniently located beneath the weight carrying arm 8 of the trap door, said weight carrying arm serving to obstruct the opening of the door 10 unless the trap door is sprung, or moved downward; the said weight carrying arm thus serves as a securing device for the door 10, but the latter may be provided with additional securing means, such as a latch 11.

The casing of the trap is provided adjacent to one end of the compartment B, and adjacent to the free end of the trap door with upward extending brackets 12 affording bearings for a rock shaft 13 carrying a yoke 14 which is provided upon its under side with a catch 15 engaging the free end of the trap door and serving to hold the latter from tripping or tilting; said catch being beveled upon its under side to permit it to be automatically engaged by the free edge of the trap door when the latter, after the trap has been sprung, seeks its normal position. The rock shaft 13 has a bait supporting hook 16. The parts just named are adjusted and arranged with sufficient delicacy to enable the trap to be readily sprung by a victim positioned upon the trap door.

The partition 3 which separates the primary compartment B from the larger compartment C has a door way 17 leading into the latter compartment and provided with a gravity door 18 under which the victims may pass into the compartment C, but which will obstruct their return into the compartment B. The compartment C will thus constitute a place of confinement in which an indefinite number of victims may be accumulated and from which they may be eventually removed and disposed of.

The operation and advantages of the improved trap will be readily understood from the foregoing description taken in connection with the drawings hereto annexed. The covering 7 of cloth or other suitable material affords a good foot hold for the vermin, and is especially useful when the trap is constructed of sheet metal which interferes with the travel of the animals, while the latter, by the presence of the cloth or other covering, will be readily induced to travel in the direction of the trap door. When the trap is properly positioned, in the corner of the room, the bait supported upon the hook 16 can be reached only by a victim standing upon the trap door, and nibbling at the bait will quickly cause the yoke 15 to swing until the free edge of the trap door is released from the catch 15, thus causing the trap door to tilt under the weight of the victim, the latter dropping into the compartment B while the trap door is reset under the impulse of the counter weight 9. The only exit from the compartment B is beneath the gravity door 18, the latter leading into the compartment C where the victims accumulate until disposed of.

We claim:

1. In an animal trap, a quadrant shaped casing having a partition connecting the two straight sides and forming a receiving compartment at the corner of the casing, a pivotally supported trap door forming the top of the receiving compartment, a yoke supported pivotally adjacent to the free end of the trap door and having a beveled catch engaging the latter, and a rock shaft supporting the yoke and having a bait hook.

2. In an animal trap, a casing having a receiving compartment and a storage compartment, a pivotally supported trap door forming the top of the receiving compartment, a yoke supported pivotally adjacent to the free end of the trap door and having a catch engaging the latter, a weight carrying arm extending from the pivotally supported end of the trap door, and a door for the storage compartment of the trap, said door being arranged beneath the weight carrying arm, and normally obstructed by said arm.

In testimony whereof, we affix our signatures in presence of two witnesses.

JOHN O. CARLSON.
CARL OSCAR HEDSTROM.

Witnesses:
S. C. STEWART,
S. L. STEWART.